(12) United States Patent
Nilsson et al.

(10) Patent No.: US 11,610,353 B2
(45) Date of Patent: *Mar. 21, 2023

(54) SEAMLESS REPRESENTATION OF VIDEO AND GEOMETRY

(71) Applicant: DreamWorks Animation L.L.C., Universal City, CA (US)

(72) Inventors: Fredrik Nilsson, Universal City, CA (US); Luke Halliwell, Universal City, CA (US); Josiah Larson, Universal City, CA (US); Matthew Christopher Gong, Pasadena, CA (US)

(73) Assignee: NBCUniversal Media LLC, Universal City, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/379,573

(22) Filed: Jul. 19, 2021

(65) Prior Publication Data

US 2021/0350599 A1 Nov. 11, 2021

Related U.S. Application Data

(63) Continuation of application No. 14/737,183, filed on Jun. 11, 2015, now Pat. No. 11,069,109.

(Continued)

(51) Int. Cl.
   *G06T 13/00* (2011.01)
   *G06T 13/40* (2011.01)
   *G11B 27/034* (2006.01)

(52) U.S. Cl.
   CPC ............ *G06T 13/00* (2013.01); *G11B 27/034* (2013.01)

(58) Field of Classification Search
   CPC .......... G06T 13/40; G06T 13/20; G06T 13/00
   See application file for complete search history.

(56) References Cited

U.S. PATENT DOCUMENTS

| 5,731,821 A | 3/1998 | Girard |
| 5,936,639 A | 8/1999 | Andalman et al. |

(Continued)

FOREIGN PATENT DOCUMENTS

| CN | 1863295 A | 11/2006 |
| CN | 101681665 A | 3/2010 |
| JP | 3583970 B2 | 8/2004 |

OTHER PUBLICATIONS

Office Action received for Chinese Patent Application No. 201510324413.X, dated Dec. 4, 2020, 9 pages. (Official copy only) See Communication under 37 CFR § 1.98(a) (3).

(Continued)

*Primary Examiner* — Yi Yang
(74) *Attorney, Agent, or Firm* — Dentons US LLP

(57) ABSTRACT

Processes for reviewing and editing a computer-generated animation are provided. In one example process, multiple images representing segments of a computer-generated animation may be displayed. In response to a selection of one or more of the images, geometry data associated with the corresponding segment(s) of computer-generated animation may be accessed. An editable geometric representation of the selected segment(s) of computer-generated animation may be displayed based on the accessed geometry data. In some examples, previously rendered representations and/or geometric representations of the same or other segments of the computer-generated animation may be concurrently displayed adjacent to, overlaid with, or in any other desired manner with the displayed geometric representation of the selected segment's) of computer-generated animation.

30 Claims, 11 Drawing Sheets

Related U.S. Application Data

(60) Provisional application No. 62/011,543, filed on Jun. 12, 2014.

(56) References Cited

U.S. PATENT DOCUMENTS

| | | | |
|---|---|---|---|
| 6,031,529 | A | 2/2000 | Migos et al. |
| 7,533,371 | B1 * | 5/2009 | Johns ................... G06F 11/323 717/124 |
| 8,214,766 | B1 | 7/2012 | Berger et al. |
| 2008/0152297 | A1 | 6/2008 | Ubillos |
| 2011/0137753 | A1 | 6/2011 | Moehrle et al. |
| 2013/0054863 | A1 * | 2/2013 | Imes ................... H04L 12/2827 709/223 |
| 2013/0124990 | A1 | 5/2013 | Lettau et al. |
| 2013/0235045 | A1 | 9/2013 | Corazza et al. |
| 2013/0262564 | A1 | 10/2013 | Wall et al. |
| 2015/0363959 | A1 | 12/2015 | Nilsson et al. |

OTHER PUBLICATIONS

Office Action received for European Patent Application No. 15171853.3, dated Jun. 21, 2021, 6 pages.

Final Office Action received for U.S. Appl. No. 14/737,183, dated Apr. 2, 2018, 27 pages.

Final Office Action received for U.S. Appl. No. 14/737,183, dated Mar. 9, 2017, 25 pages.

Non-Final Office Action received for U.S. Appl. No. 14/737,183, dated Aug. 23, 2016, 14 pages.

Non-Final Office Action received for U.S. Appl. No. 14/737,183, dated Dec. 28, 2018, 28 pages.

Non-Final Office Action received for U.S. Appl. No. 14/737,183, dated Oct. 18, 2017, 25 pages.

Office Action received for Chinese Patent Application No. 201510324413.X, dated Aug. 20, 2019, 10 pages.

Office Action received for European Patent Application No. 15171853.3, dated Sep. 19, 2019, 7 pages.

Extended European search report received for European Patent Application No. 15171853.3, dated Oct. 22, 2015, 7 pages.

Akiba et al., "AniViz: A Template-Based Animation Tool for Volume Visualization", IEEE Computer Graphics and Applications, Oct. 2010, pp. 61-71.

Mikami et al., "Diorama engine—A 3D directing tool for 3D computer animation production", Computer Graphics International, Jul. 2003, pp. 292-297.

* cited by examiner

SEAMLESS REPRESENTATION OF VIDEO AND GEOMETRY

CROSS-REFERENCE TO RELATED APPLICATIONS

This application is a Continuation of U.S. non-Provisional application Ser. No. 14/737,183 which claims the benefit under 35 U.S.C. § 119(e) of U.S. Provisional Application No. 62/011,543, filed Jun. 12, 2014, the content of which is hereby incorporated by reference in its entirety for all purposes.

BACKGROUND

1. Field

This application relates generally to computer-generated animation and, more specifically, to processes and tools for reviewing and editing a computer-generated animation.

2. Related Art

Computer-generated animations are typically created using geometric models that represent objects (e.g., trees, rocks, clouds, etc.) and characters (e.g., animals, people, etc.) within a virtual environment. Animators may manipulate these models to position the objects and characters in a desired manner for some or all of the frames within the animation. The positioned geometric models may then be combined with other animation data, such as textures, colors, lighting, and the like, in a rendering process to produce images that may be used as the frames of the animation. When the rendered frames are viewed in rapid succession, they give viewers the perception of animation.

To edit a portion of a computer-generated animation, an animator may review the previously rendered animation and may then modify the geometric models used to create that rendered version. The newly positioned geometric models may then be combined with the other animation data in another rendering process to produce updated images that may be used as the frames of the animation. This process may be repeated any number of times until a desired output is produced.

Various software tools have been developed to assist in the performance of the animation process described above. However, existing tools may be computationally expensive and difficult to use.

SUMMARY

Processes for reviewing and editing a computer-generated animation are described. One example process may include causing, by one or more processors, a display of an interface comprising a plurality of partitions representing a plurality of segments of the computer-generated animation; receiving a user selection of a first partition of the plurality of partitions; accessing geometry data associated with a first selected segment of the computer-generated animation corresponding to the selected first partition; and causing a display of a geometric representation of the first selected segment.

In some examples, the plurality of segments may include a plurality of contiguous shots of the computer-generated animation. In some examples, each of the plurality of segments may include a plurality of previously rendered frames of animation.

In some examples, the geometry data may include one or more of an animation graph, a character rig, an animation curve, and a geometric representation of a scene used to render frames of animation of the first selected segment.

In some examples, accessing geometry data associated with the first selected segment may include loading the geometry data in a memory accessible by the one or more processors.

In some examples, the process may further include: receiving a user modification to the geometric representation of the first selected segment; and causing a display of a modified geometric representation of the first selected segment based on the received user modification. In other examples, the process may further include receiving a request to store the user modification of the geometric representation of the first selected segment; and storing the user modification of the geometry representation of the first selected segment.

In some examples, the display of the geometric representation of the first selected segment may be displayed concurrently with the plurality of partitions.

In some examples, the process may further include: receiving a user selection of a second partition of the plurality of partitions; and causing a display of a previously rendered representation of a second selected segment corresponding to the selected second partition. In some examples, the display of the previously rendered representation of the second selected segment may be displayed adjacent to the geometric representation of the first selected segment. In other examples, the geometric representation of the first selected segment may be displayed overlaid on the display of the previously rendered representation of the second selected segment. In yet other examples, the display of the previously rendered representation of the second selected segment may be displayed sequentially in time with the geometric representation of the first selected segment.

Systems and computer-readable storage media for reviewing and editing a computer-generated animation are also described.

BRIEF DESCRIPTION OF THE FIGURES

The present application can be best understood by reference to the following description taken in conjunction with the accompanying figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various examples are described below relating to processes for reviewing and editing a computer-generated animation. In one example process, multiple images representing segments of a computer-generated animation may be displayed. In response to a selection of one or more of the images, geometry data associated with the corresponding segment(s) of computer-generated animation may be accessed. An editable representation of the segment(s) of computer-generated animation may be displayed based on the accessed geometry data. In some examples, previously rendered representations and/or geometric representations of the same or other segments of the computer-generated animation may be concurrently displayed adjacent to, overlaid with, or in any other desired manner with the displayed geometric representation of the selected segment(s) of computer-generated animation.

Figure 1:
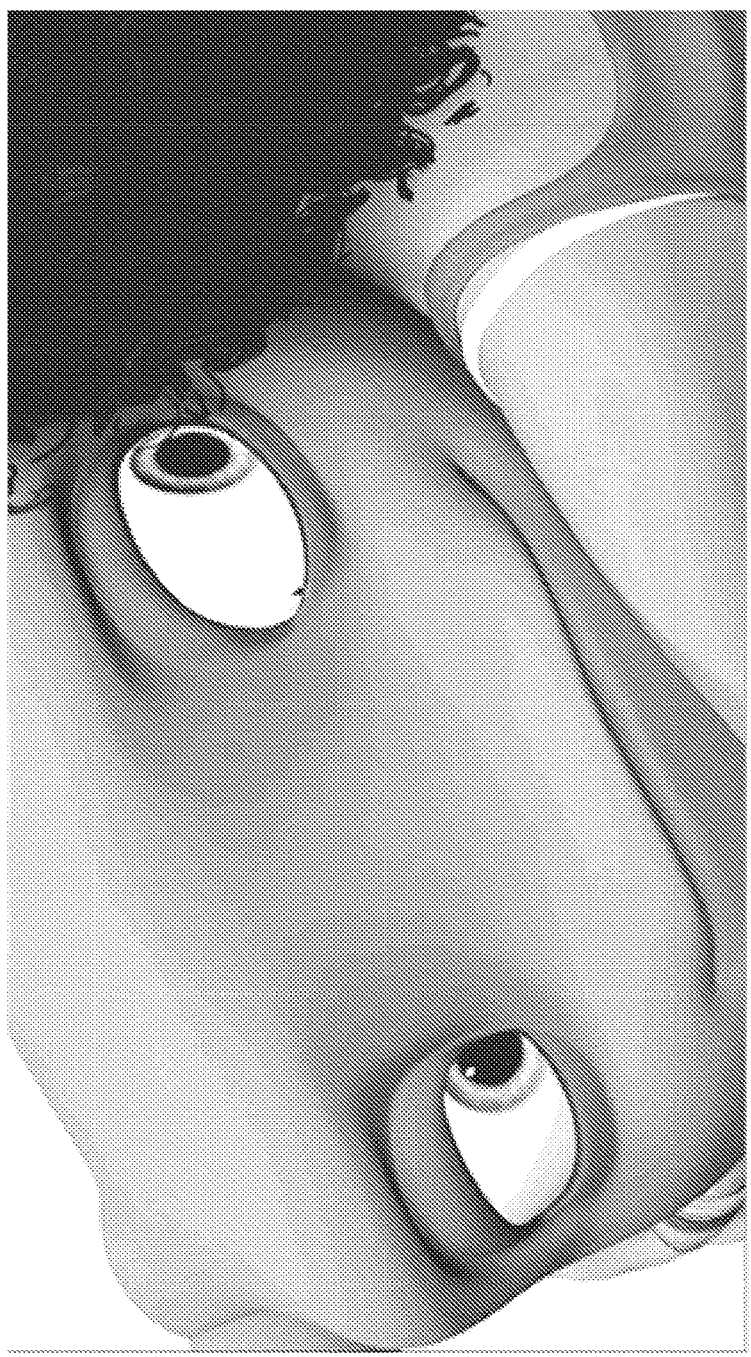
FIG. 1 illustrates an exemplary rendered image that may be generated using a video and geometry editing tool according to various examples.

FIG. 1 depicts an exemplary computer-generated image 100 that may be rendered using a video and geometry editing tool according to various examples. Notably, FIG. 1 depicts an image of two characters generated using geometric models positioned by artists during the animation process. As previously discussed, existing tools for performing the process of animating objects and characters may be computationally expensive and difficult to use.

Figure 2:
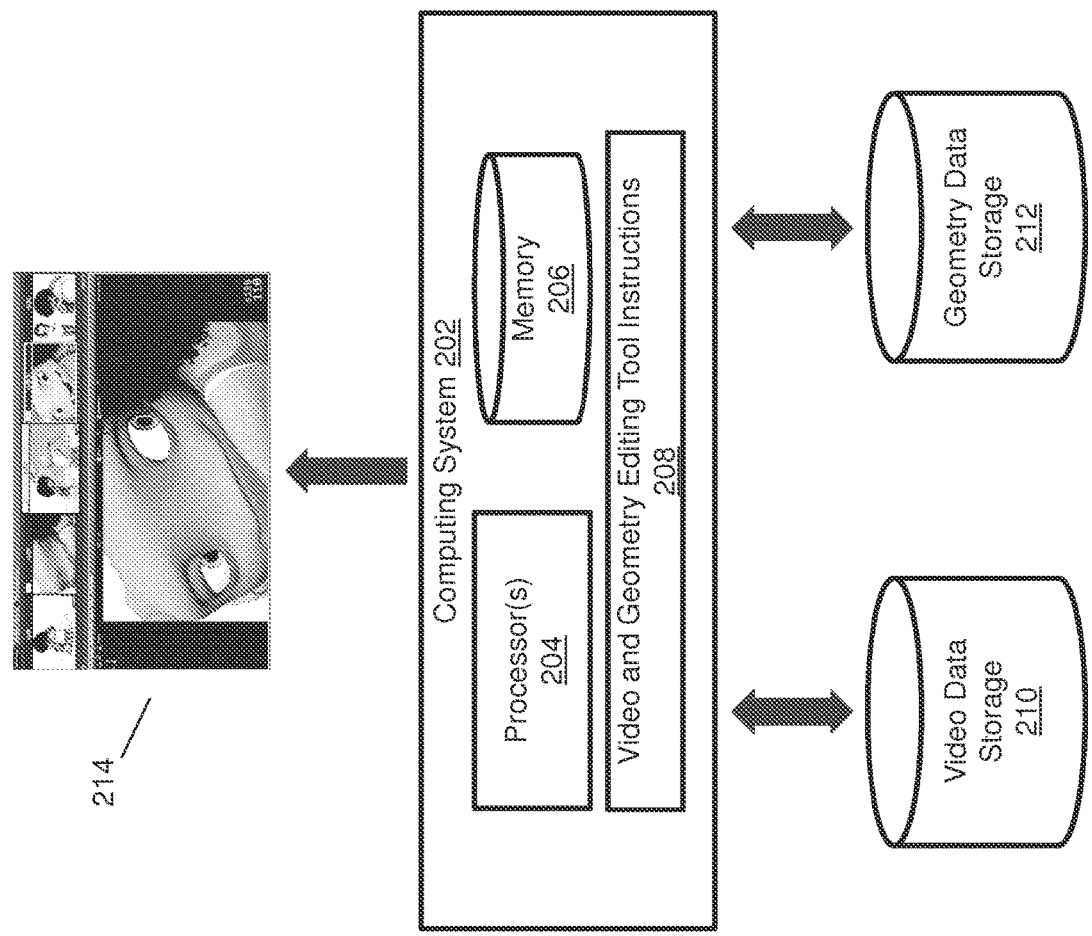
FIG. 2 illustrates an exemplary a video and geometry editing tool that may be used to review and edit a computer-generated animation according to various examples.

FIG. 2 illustrates an exemplary video and geometry editing tool 214 that may be used to review and edit images of a computer-generated animation similar to that of FIG. 1. Video and geometry editing tool 214 may be implemented using computing system 202 having one or more processors 204 for executing video and geometry editing tool instructions 208 stored on a non-transitory computer-readable storage medium of computing system 202. Computing system 202 may further include memory 206 for storing video data from video data storage 210 and geometry data from geometry data storage 212. The video data may include previously rendered animation video that may be organized into any desired segments of video (e.g., shots representing a series of frames spanning over an uninterrupted period of time). The geometry data may include geometric models of objects, characters, or other scene elements, character rigs, animation curves, animation graphs, or the like, that may be used to generate the rendered animation of the video data. As discussed in greater detail below, video and geometry editing tool 214 may be used to view previously rendered representations and geometric representations of segments of animation video. An animator, lighter, or the like, may use video and geometry editing tool 214 to edit the geometric representation of a segment of video while having the ability to view their edits within the context of surrounding segments of video and/or a previously rendered version of the same segment of video.

While video data storage 210 and geometry data storage 212 are shown as being separate databases that are separate from computing system 202, it should be appreciated that video data storage 210 and geometry data storage 212 may instead be implemented using a single storage device that is local or remote to computing system 202.

Figure 3:
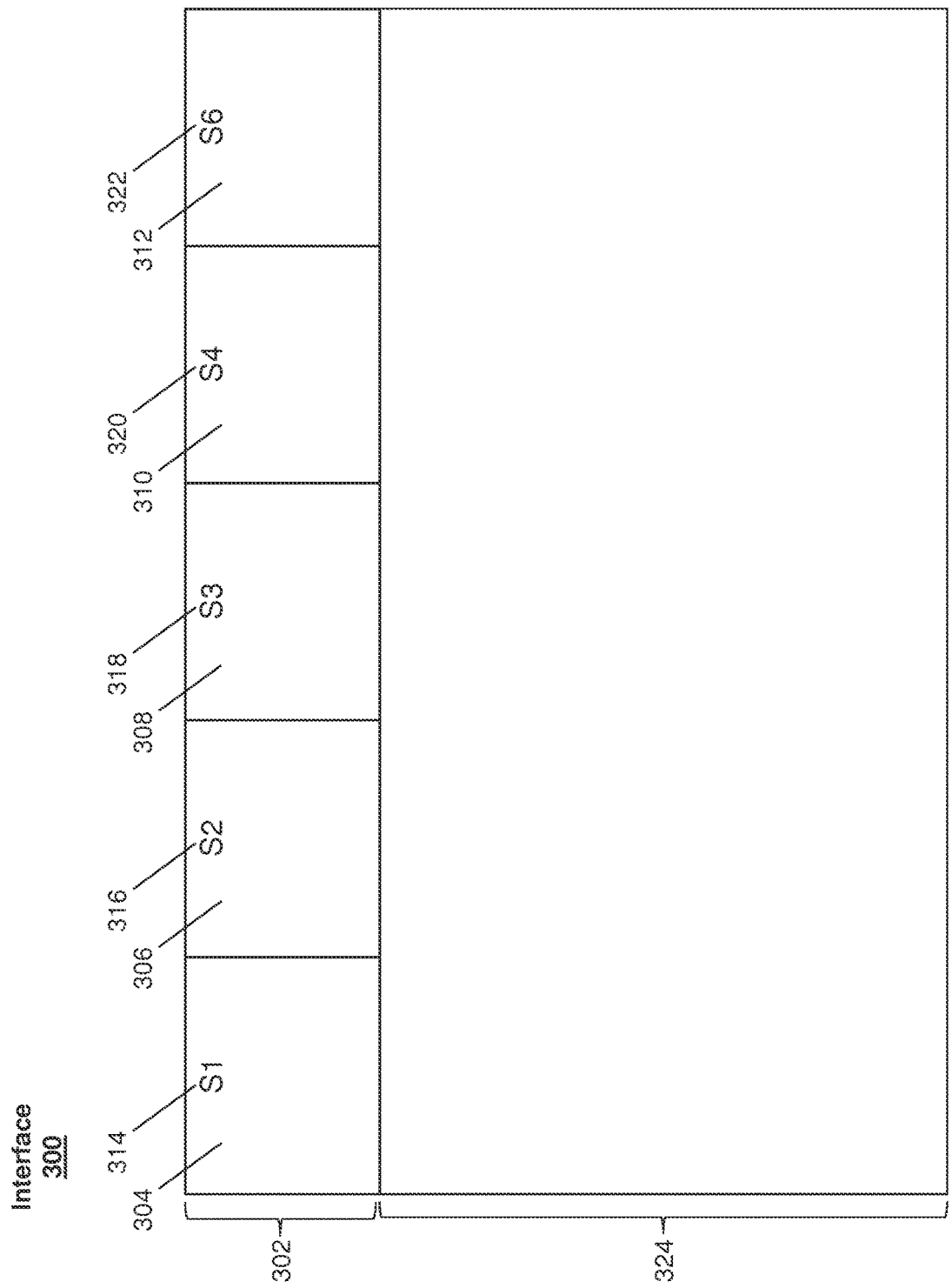
FIG. 3 illustrates an exemplary interface for a video and geometry editing tool according to various examples.

FIG. 3 illustrates an example interface 300 of video and geometry editing tool 214 according to various examples. As shown, interface 300 may generally include a segment browsing portion 302 and an active segment portion 324.

Segment browsing portion 302 may include any number of partitions 304, 306, 308, 310, and 312 that may each be populated with a thumbnail image of segment of video represented by the partition. In some examples, the segments of video represented by partitions 304, 306, 308, 310, and 312 may include previously rendered shots of a computer-generated animation stored as video data in video data storage 210. In these examples, computing system 202 may load the video data corresponding to the shots represented by partitions 304, 306, 308, 310, and 312 into memory 206 and may populate partitions 304, 306, 308, 310, and 312 using this video data. In some examples, partitions 304, 306, 308, 310, and 312 may include identifiers 314, 316, 318, 320, and 322 for uniquely identifying the displayed shots.

In some examples, the segments of video represented by partitions 304, 306, 308, 310, and 312 may be generated by different departments within an animation studio, such as editorial, crowds, animation, lighting, story, and the like. Since any of these departments may update the segments of video by generating a new render, video and geometry editing tool 214 may continuously, periodically, or at any other desired interval of time, determine if an updated segment of video is available. In these examples, a visual indicator, such as a star, a flag, or any other desired indicator may be displayed along with the corresponding image in partition 304, 306, 308, 310, or 312 to notify the user that an updated version of the segment of video is available. An option may be provided to allow the user to request that the updated version of the segment of video be loaded into memory 206 from video data storage 210.

In some examples, interface 300 can further include controls to scroll through additional partitions representing additional segments of video not shown in interface 300. For example, navigation buttons, scrolls bars, or the like, may be provided to allow a user to horizontally scroll left and tight through the partitions of segment browsing portion 302.

In some examples, in response to a first type of selection of one of partitions 304, 306, 308, 310, and 312, the segment of video represented by the selected partition may be played by displaying the frames of the segment of video in rapid succession within the selected partition. For example, in response to a first type of selection of partition 304 that may include highlighting partition 304 by hovering a cursor over partition 304, highlighting and clicking on partition 304, tapping on a portion of a touch sensitive device corresponding to partition 304, or selecting partition 304 in any other desired manner, the previously rendered segment of video corresponding to partition 304 may be played within partition 304 by displaying some or all of the frames of the segment of video in rapid succession within partition 304.

In some examples, in response to a second type of selection of one or more of partitions 304, 306, 308, 310, and 312, the segment(s) of video represented by the selected partition(s) may be displayed (e.g., the first frame of the first selected segment may be displayed) and/or played by displaying the frames of the segment(s) of video in rapid succession within active segment portion 324. For example, in response to a second type of selection of partition 304 that may include highlighting and clicking on partition 304, highlighting and double-clicking on partition 304, tapping on a portion of a touch sensitive device corresponding to partition 304, selecting an option associated with partition 304 to display the associated segment in active segment portion 324, or selecting partition 304 in any other desired manner that is distinguishable from the first type of selection, an enlarged view of the previously rendered first frame of the segment of video corresponding to partition 304 may be displayed and/or the previously rendered segment of video corresponding to partition 304 may be played within active segment portion 324. In some examples, a segment identifier (e.g., identifier 314, 316, 318, 320, or 322) and a frame identifier (e.g., a frame number within a segment) for each frame displayed within active segment portion 324 may be displayed along with the corresponding frame within active segment portion 324.

In some examples, controls may be provided within interface 300 to adjust the playback speed of the segment of video played within active segment portion 324. For example, a "play" button may be provided to cause a segment of video displayed within active segment portion 324 to be played at a normal speed. Other controls can be provided to cause the segment of video displayed within active segment portion 324 to be played at faster or slower speeds and in forward or reverse directions. Additionally, video and geometry editing tool 214 may allow a user to slowly scrub through frames of a segment of video in one direction by, for example, clicking and dragging on the displayed segment of video within active segment portion 324 in a particular direction, and to scrub through frames of a segment of video in the opposite direction by clicking and dragging on the displayed segment of video within active segment portion 324 in the opposite direction. It should be appreciated that other controls may similarly be used to provide these playback functions. If multiple partitions are selected from segment browsing portion 302, the segments of video represented by the multiple partitions may be played in succession within active segment portion 324 (e.g., based on their order within segment browsing portion 302 or their associated segment identifiers).

In some examples, in response to a third type of selection of one or more of partitions 304, 306, 308, 310, and 312, a geometric representation of the segment(s) of video represented by the selected partition(s) may be displayed (e.g., the first frame of the geometric representation of the first selected segment may be displayed) and/or played by displaying the frames of the geometric representation of the segments) of video in rapid succession within active segment portion 324. The geometric representation may include frames corresponding to the frames of the selected segments) of video, with each frame containing a visual representation of the geometry data (e.g., the geometric models of objects, characters, or other scene elements, character rigs, animation curves, animation graphs, or the like) as configured to generate the corresponding frame of animation in the segment of video. For example, the first frame of the geometric representation of a segment of video may include the geometric models of the objects and characters in a scene as positioned to create the rendered first frame of the segment of video. The other frames of the geometric representation may similarly include the geometric models of the objects and characters in a scene as positioned to create the rendered frames of the segment of video. In response to a selection of the partition(s) using the third type of selection, computing system 202 may load the geometry data corresponding to the segment(s) of video represented by the selected partition(s) (e.g., the geometric models of objects, characters, other scene elements, or the like, that may be used to generate the segment of video) into memory 206 and may populate active segment portion 324 using this geometry data. For example, in response to a third type of selection of partition 304 that may include highlighting and clicking on partition 304, highlighting and double-clicking on partition 304, tapping on a portion of a touch sensitive device corresponding to partition 304, selecting an option associated with partition 304 to display the associated geometric representation of a segment in active segment portion 324, or selecting partition 304 in any other desired manner that is distinguishable from the first and second types of selections, geometry data associated with the segment of video corresponding to partition 304 may be loaded into memory 206 from geometry data storage 212 and a geometric representation of the first frame of the segment of video corresponding to partition 304 may be displayed and/or the geometric representations of the frames of the segment of video corresponding to partition 304 may be played in rapid succession within active segment portion 324. In some examples, a segment identifier (e.g., identifier 314, 316, 318, 320, or 322) and a frame identifier (e.g., a frame number within a segment) for each frame of the displayed geometric representation may be displayed along with the corresponding frame of the geometric representation within active segment portion 324.

In some examples, controls may be provided within interface 300 to adjust the playback speed of the frames of the geometric representation of the segment of video played within active segment portion 324. For example, a "play" button may be provided to cause a geometric representation of a segment of video displayed within active segment portion 324 to be played at a normal speed. Other controls can be provided to cause the geometric representation of the segment of video displayed within active segment portion 324 to be played at faster or slower speeds and in forward or reverse directions. Additionally, video and geometry editing tool 214 may allow a user to slowly scrub through frames of a geometric representation of the segment of video in one direction by, for example, clicking and dragging on the displayed geometric representation of the segment of video within active segment portion 324 in a particular direction, and to scrub through frames of a geometric representation of the segment of video in the opposite direction by clicking and dragging on the displayed geometric representation of the segment of video within active segment portion 324 in the opposite direction. It should be appreciated that other controls may similarly be used to provide these playback functions. If multiple partitions are selected, the geometric representations of the segments of video represented by the multiple partitions may be displayed and/or played in succession within active segment portion 324 (e.g., based on their order within segment browsing portion 302 or their associated segment identifiers)
.

In some examples, the geometric representation of a segment of video displayed within active segment portion 324 may be editable using any of various input mechanisms. For example, a geometric model of an object, character, or other scene element, character rig, animation curve, animation graph, or the like, displayed within a frame of the geometric representation may be moved or otherwise modified in response to a click and drag operation. In response, the underlying numerical value(s) of the geometry data of the displayed frame may be modified to reflect the modifications made to the displayed geometric representation. This may allow a user of video and geometry editing tool 214 to easily and intuitively reposition characters or objects within a frame by manually moving them to the desired position. In other examples, other input mechanisms, such as text entry fields, may be provided within interface 300 to allow a user of video and geometry editing tool 214 to enter or change values of parameters of the geometry data for the displayed frame. For example, text entry fields may be provided to allow a user to change parameters of a character rig to define a position of a character.

In some examples, one or more of partitions 304, 306, 308, 310, and 312 may be selected using the second type of selection and one or more other partitions 304, 306, 308, 310, and 312 may be selected using the third type of selection. In these examples, the previously rendered segments of video represented by the one or more partitions selected using the second type of selection may be displayed in succession with the geometric representations of the one or more other partitions 304, 306, 308, 310, and 312 selected using the third type of selection within active segment portion 324. For example, if partitions 304 and 308 are selected using the second type of selection, and if partition 306 is selected using the third type of selection, the previously rendered segment of video represented by partition 304 may be played within active segment portion 324, followed by the playing of the geometric representation of the segment of video represented by partition 306, and followed by the playing of the previously rendered segment of video represented by partition 308. This advantageously allows an animator or other user of video and geometry editing tool 214 to view a currently modified geometric view of a segment of video within the context of a previous and/or subsequent segment of previously rendered video to see how the modified segment of video fits in with the surrounding segments of video.

In some examples, the geometric representation of a selected segment of video may be overlaid on a previously rendered representation of the selected segment of video. In these examples, the geometric representation and previously rendered video representation may be displayed such that corresponding frames from each may be displayed at the same time. This advantageously allows an animator or other user of video and geometry editing tool 214 to see how changes made to the geometric representation compare to the previously rendered video representation.

In some examples, a previously rendered video representation or geometric representation of a segment of video may be modified using a drawing tool to manually add lines, color, or the like, to the displayed representation. In these examples, the drawn modifications may be selectively displayed (e.g., may be turned on or off) on the previously rendered video representation, the geometric representation, or both the previously rendered video representation and the geometric representation.

Figure 4:
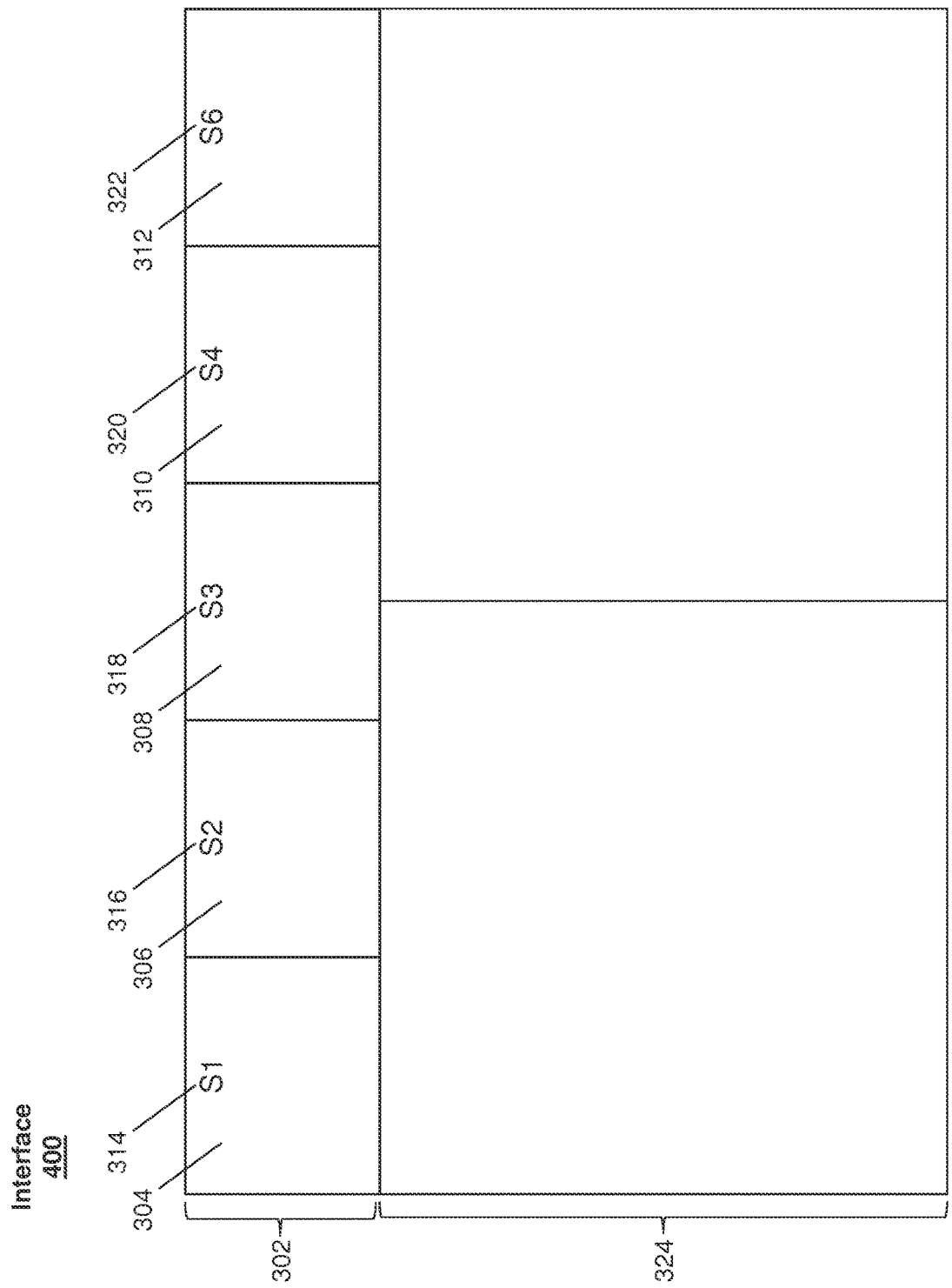
FIG. 4 illustrates another exemplary interface for a video and geometry editing tool according to various examples.

In some examples, as shown in FIG. 4, active segment portion 324 may be divided into two or more partitions. In these examples, any segment of video, frame of a segment of video, geometric representation of a segment of video, or a frame of a geometric representation of a segment of video may be displayed within each partition of active segment portion 324 in response to selections of the corresponding partitions in segment browsing portion 302 using the second or third type of selection, as discussed above. For example, a previously rendered segment of video may be played in one partition of active segment portion 324 while a geometric representation of the previously rendered segment of video may be played concurrently in the second partition of active segment portion 324 such that the frames of the previously rendered segment of video and the geometric representation of that segment of video may be displayed at the same time. In some examples, the camera settings of the two representations shown in active segment portion 324 may be matched so the images are directly comparable. This advantageously allows an animator or other user of video and geometry editing tool 214 to simultaneously view a previously rendered version of a segment of video and a currently modified geometric view of that segment of video to see how the modifications compare to the previously rendered segment of video.

In other examples, two geometric representations of two segments of video may be displayed within the partitions of active segment portion 324. In these examples, a component of a first geometric representation, such as some or all of a geometric model of an object, character, or other scene element, some or all of a character rig, some or all of an animation curve, animation graph, or the like, within a frame of the first geometric representation displayed in a first partition of active segment portion 324 may be copied to a frame of a second geometric representation displayed in the second partition of active segment portion 324. This can be accomplished using a copy/paste operation, clicking and dragging the component of the first geometric representation to the second geometric representation, or the like. In response, the second geometric representation may be modified and displayed to include the copied component of the first geometric representation. Additionally, the underlying numerical value(s) of the geometry data of the second geometric representation for the displayed frame may be modified to reflect the modifications made to the second geometric representation (e.g., modified to have the same values of the geometric component of the first geometric representation). In other examples, the component of the first geometric representation may be copied to a frame of a second geometric representation using an active segment portion 324 having a single partition, such as that shown in FIG. 3. In these examples, the first geometric representation may be selected for display within active segment portion 324 and the desired component of the first geometric representation may be selected and copied. The second geometric representation may then be selected for display within active segment portion 324 and the copied component may be pasted to the second geometric representation. In response, the second geometric representation may be modified and displayed to include the copied component of the first geometric representation. Additionally, the underlying numerical value(s) of the geometry data of the second geometric representation for the displayed frame may be modified to reflect the modifications made to the second geometric representation (e.g., modified to have the same values of the geometric component of the first geometric representation).

While the examples provided above describe the display of partitions representing shots of a computer-generated animation and displaying the previously rendered video shots or geometric representations of the shots in response to a selection of a partition, it should be appreciated that the partitions may represent any type of segment of video or non-editable data, and that any other type of representation (e.g., an editable representation) of the segments of video or non-editable data may be displayed in response to a selection of a partition. For example, the partitions may represent segments of actual footage from a motion capture session, while an editable form of a computer-generated animation created from the motion capture process may be displayed in response to a selection of a partition.

Figure 5:
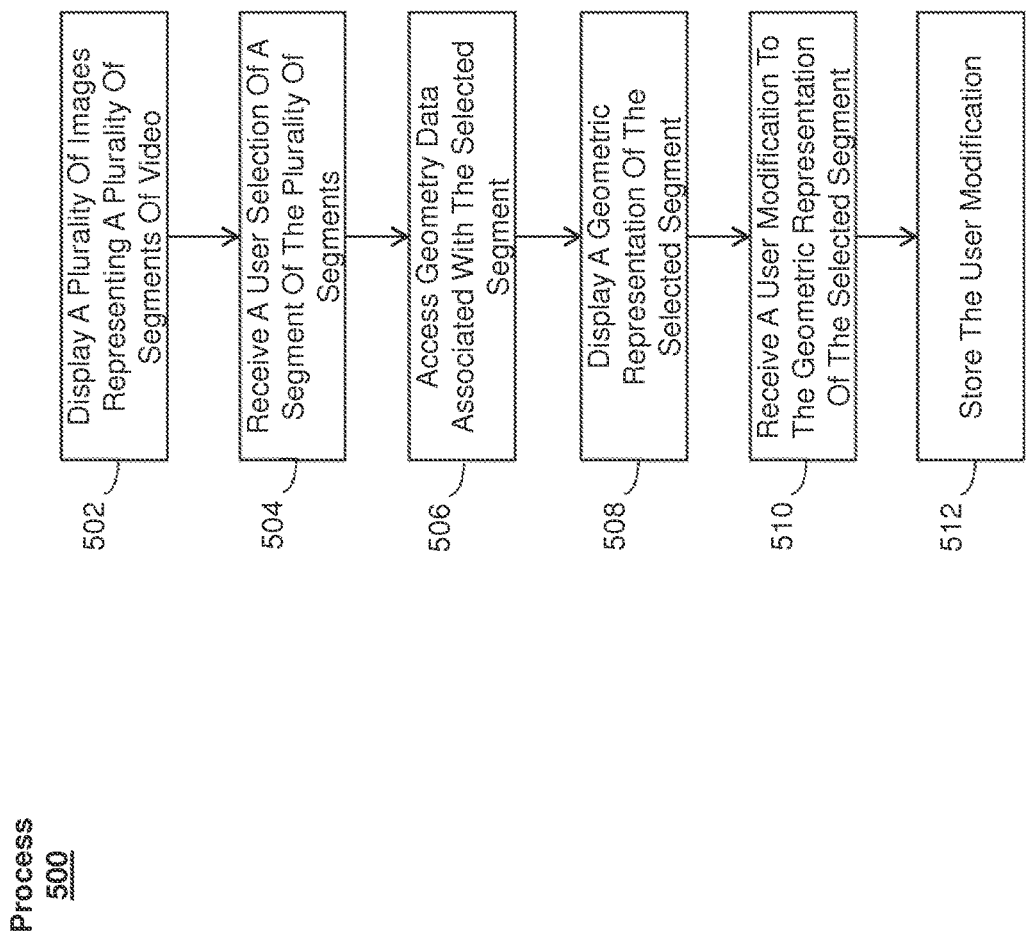
FIG. 5 illustrates an exemplary process for reviewing and editing a computer-generated animation using a video and geometry editing tool according to various examples.
Figure 6:
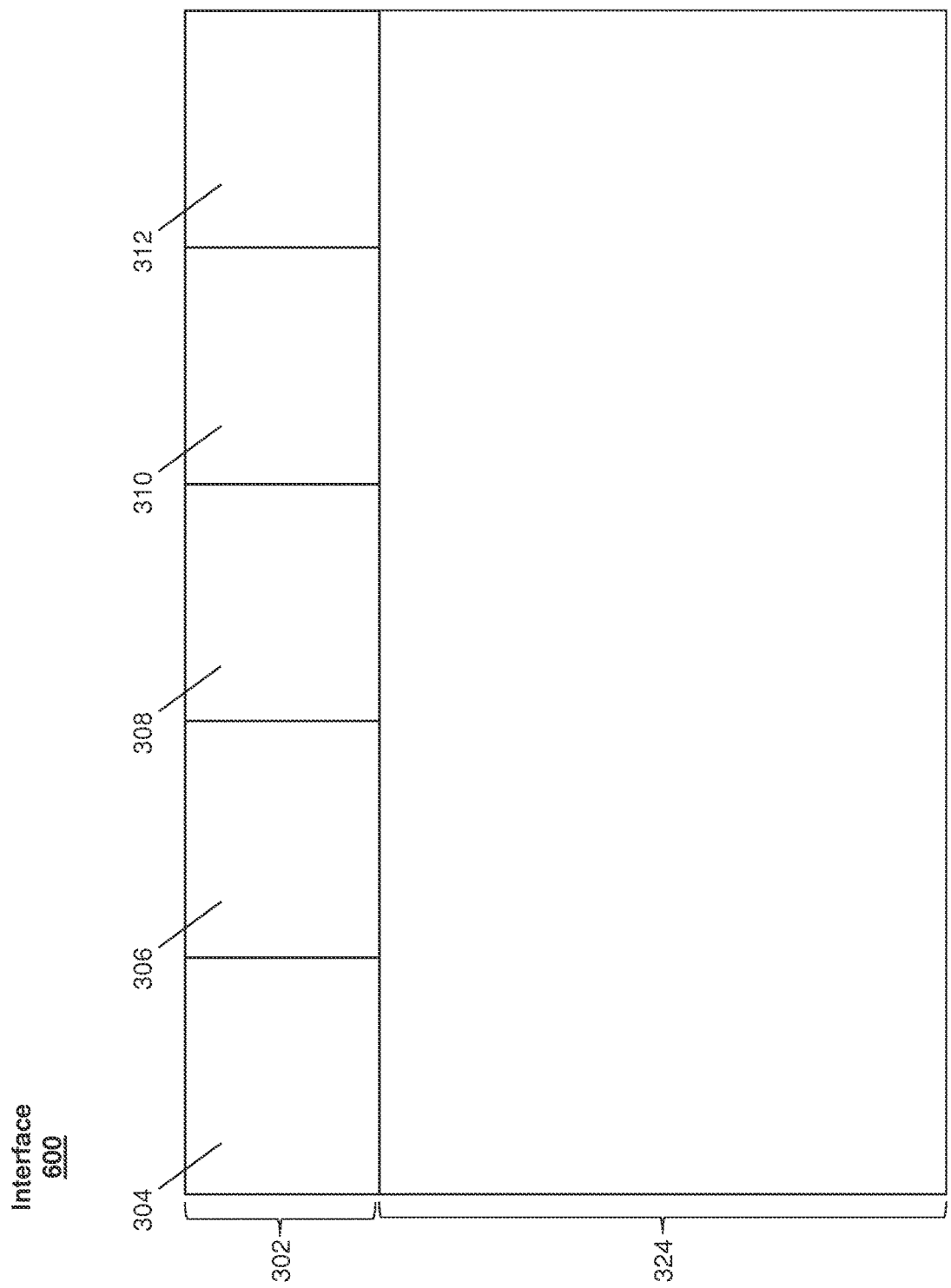
FIG. 6 illustrates an exemplary interface for a video and geometry editing tool that may be generated using the process of FIG. 5 according to various examples.

FIG. 5 illustrates an exemplary process 500 for reviewing and editing a computer-generated animation using video and geometry editing tool 214 according to various examples. At block 502, an interface of video and geometry editing tool 214 may be displayed. The interface may be similar or identical to those shown in FIGS. 3 and 4, and may be generated using a computing system similar or identical to that shown in FIG. 2. In some examples, the partitions of the segment browsing portion (e.g., segment browsing portion 302) and the partition(s) of the active segment portion (e.g., active segment portion 324) may be empty at the start of process 500, as illustrated by interface 600 of FIG. 6.

Figure 7:
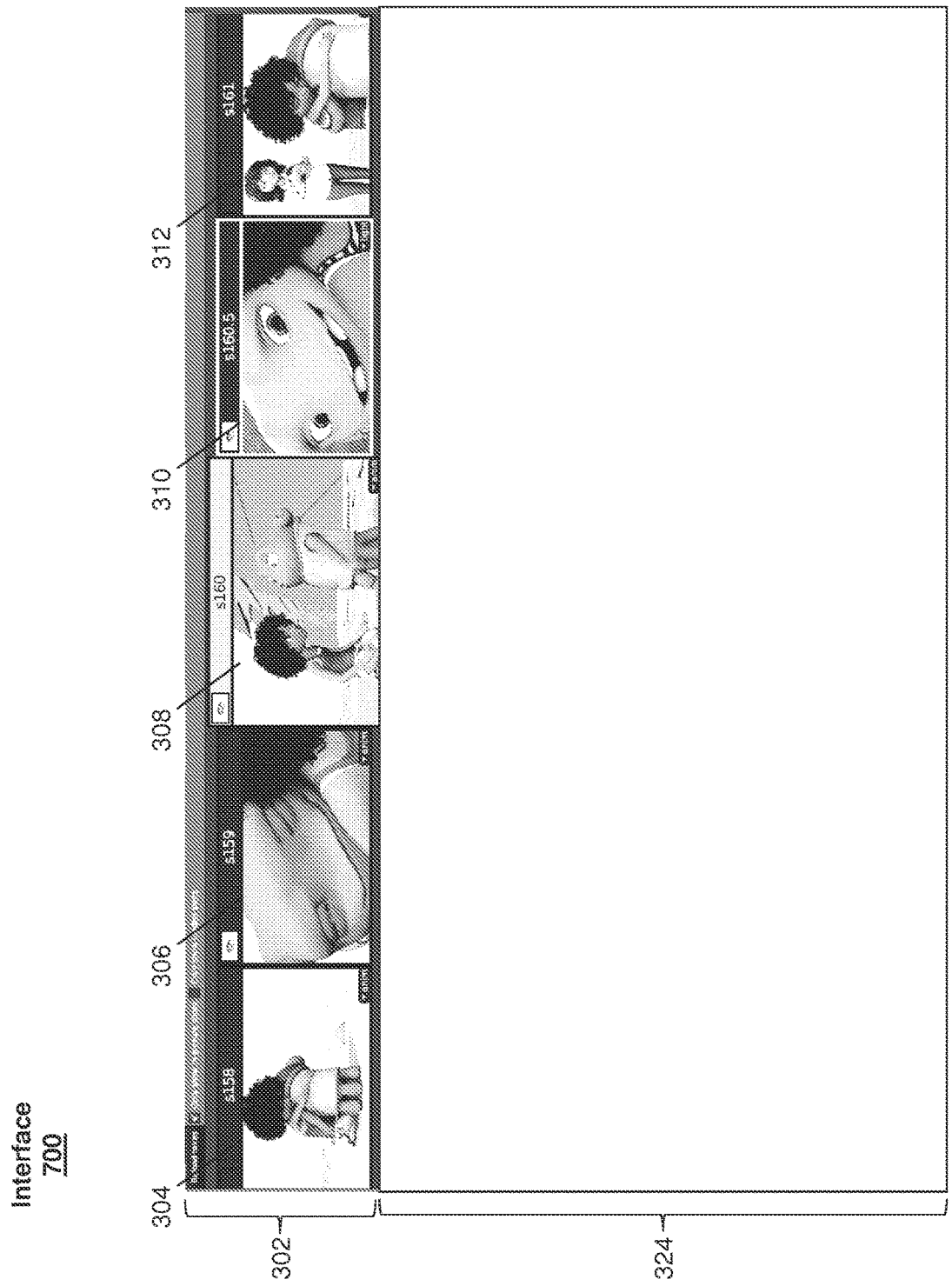
FIG. 7 illustrates an exemplary interface for a video and geometry editing tool that may be generated using the process of FIG. 5 according to various examples.

In response to a user selection of a plurality of segments of video e.g., shots of a computer-generated animation), the segments of video may be loaded from a local or remote database, such as video data storage 210, into the memory (e.g., memory 206) of the computing system (e.g., computing system 202) to allow the computing system to access and process the segments of data more quickly. Additionally, a plurality of images representing the plurality of segments of video may be generated and displayed within the partitions of the segment browsing portion. For example, FIG. 7 shows interface 700 having partitions 304, 306, 308, 310, and 312 populated with thumbnail images representing five different segments of video having identifiers s158, s159, s160, s160.5, and s161.

At block 504, a user selection of one or more of the plurality of segments to cause a geometric representation of the selected segment(s) to be displayed may be received. As discussed above, the user selection of one or more of the plurality of segments may be made in any desired manner, such as highlighting and clicking on one or more of the plurality of images associated with the one or more segments, highlighting and double-clicking on one or more of the plurality of images associated with the one or more segments, tapping on a portion of a touch sensitive device corresponding to on one or more of the plurality of images associated with the one or more segments, selecting an option associated with on one or more of the plurality of images associated with the one or more segments, or selecting one or more of the plurality of images associated with the one or more segments in any other desired manner. Block 504 may further include receiving user selections of one or more of the other segments of the plurality of segments to cause a previously rendered video representation of the selected segment(s) to be displayed may be received. For example, a user selection of segments s159 and s160.5 in interface 700 to cause a previously rendered video representation of segments s159 and s160.5 and a user selection of an option associated with segment s160 to cause a geometric representation of segment s160 to be displayed may be received.

At block 506, geometry data associated with the one or more segments of video selected to be displayed using a geometric representation at block 504 may be accessed. The geometry data may include geometric models of objects, characters, or other scene elements, character rigs, animation curves, animation graphs, or the like, that may be used to generate the segments of video selected at block 504. For example, the geometry data may include configurations of the geometric models of objects, characters, or other scene elements, character rigs, animation curves, animation graphs, or the like for each frame of the selected segments of video. In some examples, the geometry data may be stored in a local or remote database, such as geometry data storage 212. In these examples, the computing system (e.g., computing system 202) may load the geometry data associated with the segments of video selected at block 504 from the local or remote database (e.g., geometry data storage 212) into the memory (e.g., memory 206) of the computing system to allow the computing system to access and process the geometry data more quickly. In some examples, only the geometry data associated with the selected segments of data may be loaded into memory (and not the geometry data associated with the other segments of data) at block 506. This advantageously reduces the amount of memory required by the computing system to operate video and geometry editing tool 214 by limiting the amount of geometry data, which may be computationally expensive to process, that is loaded into the computing system.

To illustrate, continuing with the example provided above, the geometry data associated with segment s160 may be accessed from the local or remote database (e.g., geometry data storage 212) and loaded into the memory (e.g., memory 206) of the computing system in response to the user selecting segment s160 in interface 700 to be displayed using a geometric representation. The geometry data associated with segment s160 may include the configurations and parameter values for the geometric models of objects, characters, or other scene elements, character rigs, animation curves, animation graphs, or the like for each frame of segment s160.

At block 508, a geometric representation of the one or more segments of video selected to be displayed using a geometric representation at block 504 may be displayed. In some examples, the geometric representation may include frames corresponding to the frames of the selected segment(s) of video, with each frame containing a visual representation of the geometry data. (e.g., the geometric models of objects, characters, or other scene elements, character rigs, animation curves, animation graphs, or the like) as configured to generate the corresponding frame of animation in the segment of video. Thus, in contrast to displaying a previously rendered representation of one or more segments of video, displaying the geometric representation of the one or more segments of video may include evaluating the geometric models of objects, characters, or other scene elements, character rigs, animation curves, animation graphs, or the like to generate each frame of the geometric representation. The geometric representation of the one or more segments of video may be displayed within the active segment portion (e.g., active segment portion 324) of the interface of video and geometry editing tool 214. In some examples, block 508 may further include displaying previously rendered video representations of segments of video that were selected at block 504 to be displayed using a previously rendered video representation. If multiple segments of video were selected at block 504 (to be displayed using either a previously rendered video representation or a geometric representation), the previously rendered video representation(s) and/or geometric representation(s) may be displayed sequentially within the active segment portion of the interface.

Figure 8:
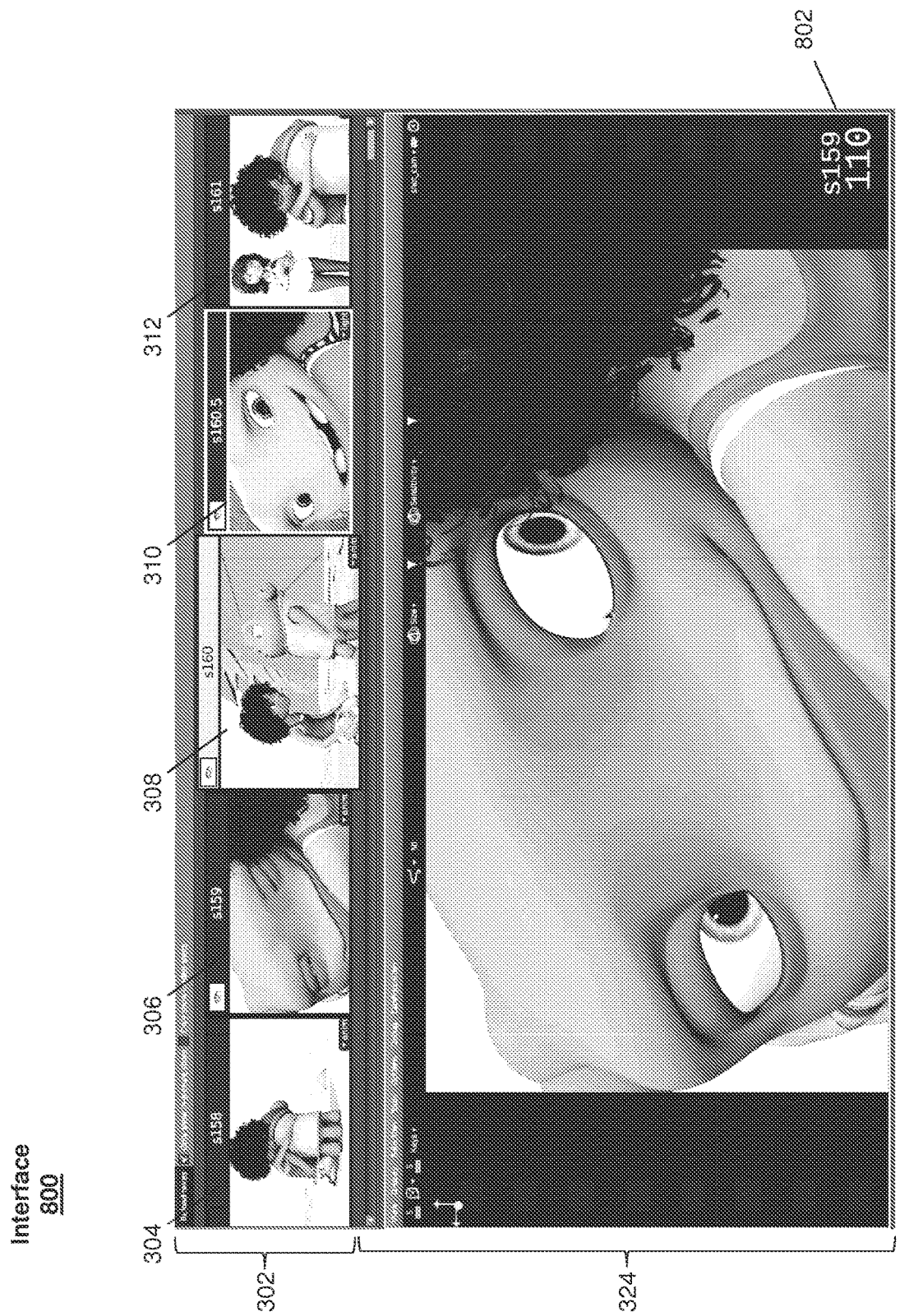
FIG. 8 illustrates another exemplary interface for a video and geometry editing tool that may be generated using the process of FIG. 5 according to various examples.

To illustrate, continuing with the example provided above, FIG. 8 shows the previously rendered video representation of segment s159 being displayed within active segment portion 324 of interface 800 in response to a user selecting segments s159 and s160.5 to be displayed using a previously rendered video representation, and selecting segment s160 to be displayed using a geometric representation. In some examples, the previously rendered video representation of the frames of segment s159 may be played sequentially in order in a predetermined or user-selected speed. As shown in the bottom right corner of FIG. 8, interface 800 may include segment and frame identifiers 802 (e.g., segment identifier s159 and frame identifier 110). The frame identifier may change to reflect the currently displayed frame of the segment.

Figure 9:
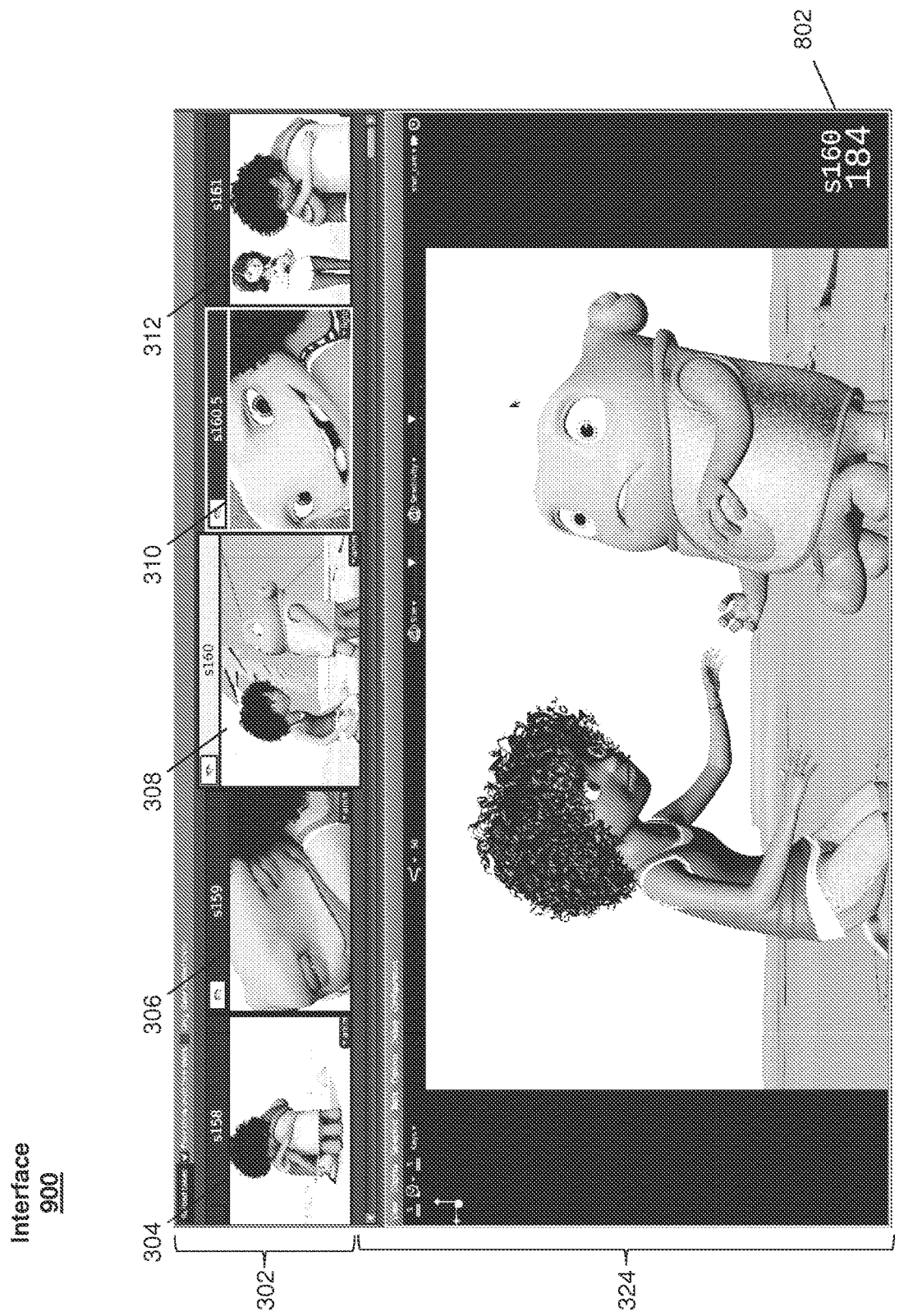
FIG. 9 illustrates another exemplary interface for a video and geometry editing tool that may be generated using the process of FIG. 5 according to various examples.

FIG. 9 shows a geometric representation of segment s160 that may be displayed within active segment portion 324 after the previously rendered video representation of segment s159 is displayed in FIG. 8. As mentioned above, the geometric representation may include a visual representation of the geometry data (e.g., the geometric models of objects, characters, or other scene elements, character rigs, animation curves, animation graphs, or the like) as configured to generate segment s160. Thus, in contrast to the video representation of segment s159 shown in FIG. 8, the geometric representation of segment s160 may be displayed by evaluating the geometric models of objects, characters, or other scene elements, character rigs, animation curves, animation graphs, or the like to generate each frame of the geometric representation. In some examples, the frames of the geometric representation of segment s160 may be played sequentially in order in a predetermined or user-selected speed. As shown in the bottom right corner of FIG. 9, interface 900 may include segment and frame identifiers 802 (e.g., segment identifier s160 and frame identifier 184). The frame identifier may change to reflect the currently displayed frame of the segment.

Figure 10:
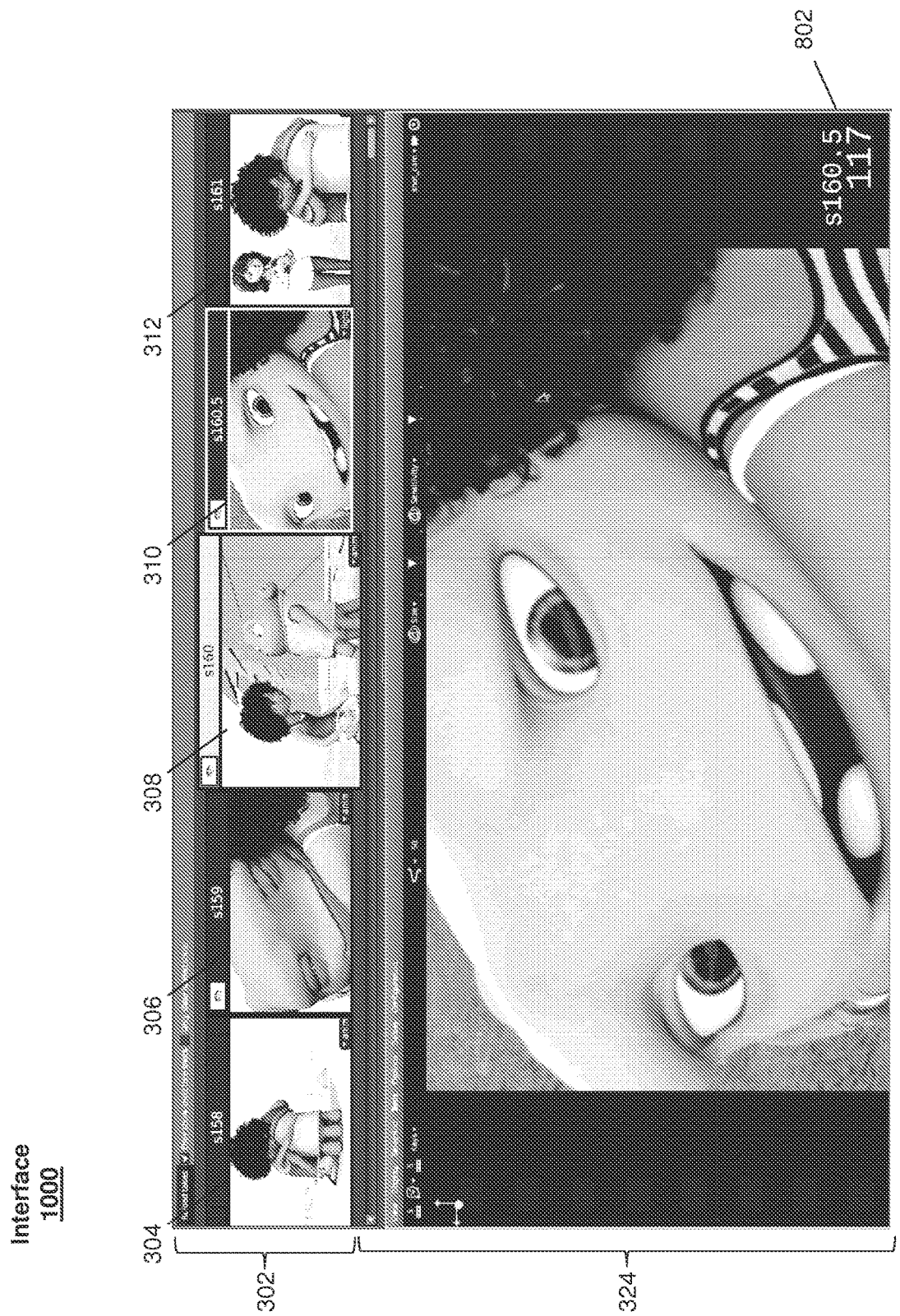
FIG. 10 illustrates another exemplary interface for a video and geometry editing tool that may be generated using the process of FIG. 5 according to various examples.

FIG. 10 shows a previously rendered video representation of segment s160.5 that may be displayed within active segment portion 324 after the geometric representation of segment s160 is displayed in FIG. 9. In some examples, the frames of the previously rendered video representation of segment s160.5 may be played sequentially in order in a predetermined or user-selected speed. As shown in the bottom right corner of FIG. 10, interface 1000 may include segment and frame identifiers 802 (e.g., segment identifier s160.5 and frame identifier 117). The frame identifier may change to reflect the currently displayed frame of the segment.

Displaying the geometric view of a segment of video along with previously rendered video representation(s) of other segments of video advantageously allows an animator or other user of video and geometry editing tool 214 to view a currently modified geometric view of a segment of video within the context of a previous and/or subsequent segment of previously rendered video to see how the modified segment of video fits in with the surrounding segments of video.

In some examples, controls may be provided within the interface of video and geometry editing tool 214 to adjust the playback speed of the geometric representation and/or previously rendered video representation of the segment of video played within the active segment portion. For example, a "play" button may be provided to cause the geometric representation and/or previously rendered video representation of a segment of video displayed within the active segment portion to be played at a normal speed. Other controls can be provided to cause the geometric representation and/or previously rendered video representation segment of the video displayed within the active segment portion to be played at faster or slower speeds and in forward or reverse directions. Additionally, video and geometry editing tool 214 may allow a user to slowly scrub through frames of the geometric representation and/or previously rendered video representation of the segment of video in one direction by, for example, clicking and dragging on the displayed segment of video within the active segment portion in a particular direction, and to scrub through frames of the geometric representation and/or previously rendered video representation of the segment of video in the opposite direction by clicking and dragging on the displayed segment of video within the active segment portion in the opposite direction. It should be appreciated that other controls may similarly be used to provide these playback functions.

Referring back to FIG. 5, in some examples, block 508 may include displaying the geometry representation of the selected segment of video overlaid on a previously rendered representation of the selected segment of video. In these examples, the geometric representation and previously rendered video representation may be displayed such that corresponding frames from each may be displayed at the same time. This advantageously allows an animator or other user of video and geometry editing tool 214 to see how changes made to the geometric representation compare to the previously rendered video representation. In other examples, more than one geometric representation and/or previously rendered video representation may be displayed within multiple partitions of active segment portion 324.

As discussed above, the geometric representation of a segment of video may be editable using any of various input mechanisms. Thus, at block 510, a user modification to the geometric representation displayed at block 508 may be received. For example, a geometric model of an object, character, or other scene element, character rig, animation curve, animation graph, or the like, displayed within a frame of the geometric representation may be moved or otherwise modified in response to a click and drag operation. In response, the underlying numerical value(s) of the geometry data of the displayed frame may be modified to reflect the modifications made to the displayed geometric representation. This may advantageously allow a user of video and geometry editing tool 214 to easily and intuitively reposition characters or objects within a frame by manually moving them to the desired position. In other examples, other input mechanisms, such as text entry fields, may be provided within the interface of video and geometry editing tool 214 to allow a user of video and geometry editing tool 214 to enter or change values of parameters of the geometry data for the displayed frame. For example, a user may click and drag the edge of a character's mouth in the interface shown in FIG. 9 to cause the mouth to move in response to the click and drag operation. Upon release of the click and drag operation, the mouth may be repositioned and the values of the parameters of the underlying geometry data associated with frame 184 of segment s160 may be changed to reflect the user modification. Thus, when frame 184 of segment s160 is displayed again, the geometric representation may reflect the change made to the character's mouth. The user may navigate to other frames and/or segments of video to similarly edit the geometric representations of those frames.

In other examples, as discussed above, the user modification to the geometric representation may be received using a copy/paste operation. For example, a user may select a component of a displayed geometric representation, such as the mouth of the character on the right of frame 184 of segment s160 shown in FIG. 9. A different frame of the same or a different segment may be selected for display within active segment portion 324 (e.g., by selecting a different segment from segment browsing portion 302 or navigating to a desired frame within the currently displayed segment s160). A paste operation may then be performed to cause the underlying parameter values of the corresponding component in the newly selected frame, such as the mouth of the same character in the newly selected frame, to be replaced with the copied parameter values from frame 184 of segment s160. As a result, the shape of the character's mouth in the newly selected frame may match that of the character's mouth of frame 184 of segment s160. This may advantageously allow a user of video and geometry editing tool 214 to easily and intuitively copy a desired appearance of all or some of an object or character from one frame to the same object or character in another frame.

In other examples, a previously rendered video representation or geometric representation may be modified using a drawing tool to manually add lines, color, or the like, to the displayed representation. In these examples, the drawn modifications may selectively be displayed on the previously rendered video representation, the geometric representation, or both the previously rendered video representation and the geometric representation.

At block 512, the user modifications received at block 512 may be stored (e.g., in geometry data storage 212) in response to a user request to store the changes. As a result, subsequent renders of the segment of data may generate an animation that reflects the stored changes.

While shown in a particular order, it should be appreciated that the blocks of process 500 may be performed in any desired order or may not be performed at all. For example, after performing blocks 502, 504, 506, and 508 to display a geometric representation of a segment of video, blocks 504, 506, and 508 may again be performed to display a geometric representation of another segment of video. Additionally, additional steps may be performed before or between blocks of process 500. For example, a previously rendered representation of a segment of video may be displayed, and an edit option may be selected to cause blocks 504, 506, and 508 to be performed to replace the previously rendered representation with an editable geometric representation of the segment of video. Additionally, a user may switch between a view of a geometric representation of a segment of video and a previously rendered representation of the segment of video by repeatedly performing blocks 504, 506, and 508 to select the segment of video for display using the two different representations.

Using video and geometry editing tool 214 and process 500, an animator, lighter, or other user of the tool may advantageously view an editable version of a segment of video (e.g., the geometric representation of a segment of video) along with a previously generated version of the segment of video (e.g., the previously rendered computer-generated animation) and/or a previously generated version of other segments of the video. This advantageously allows the user to view the modifications made to the editable version within the context of other segments of the video and/or previously generated version to see how the changes fit in within the video as a whole and how they compare to previous versions of the video. Additionally, video and geometry editing tool 214 and process 500 may advantageously reduce the memory required by the computing system to review and edit a computer-generated animation by limiting the amount of geometry data, which may be computationally expensive to process, that is loaded into the computing system.

While the examples provided above relate to the display of previously rendered and geometric representations of a computer-generated animation, it should be appreciated that video and geometry editing tool 214 and process 500 may similarly be used to display and edit any type of data that can be presented in an editable and non-editable form. For example, video and geometry editing tool 214 and process 500 may be used to display non-editable footage from a motion capture session as well as the editable computer-generated animation created from the motion capture process.

Figure 11:
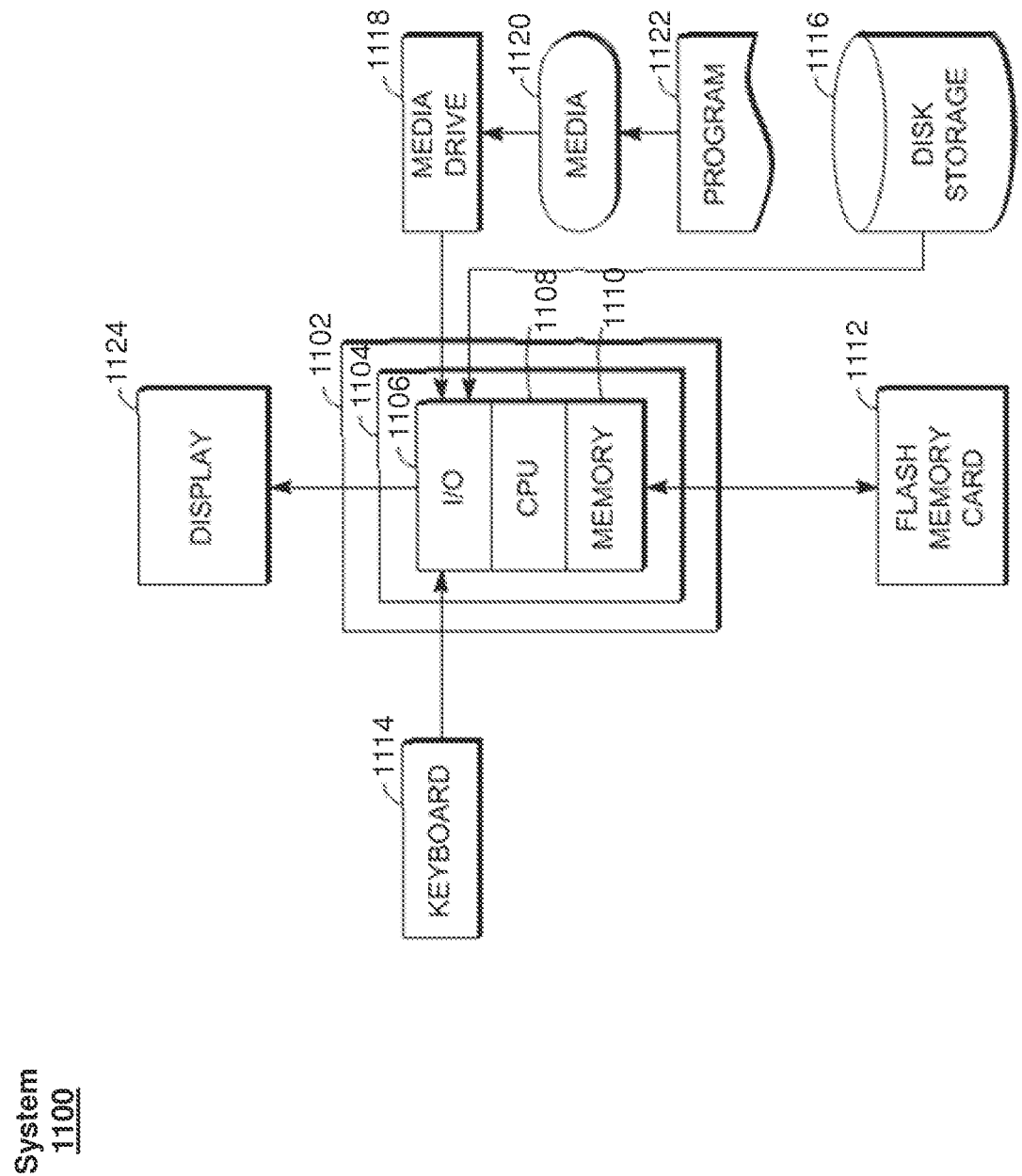
FIG. 11 illustrates an exemplary computing system.

Turning now to FIG. 11, components of an exemplary computing system 1100, configured to perform any of the above-described processes and/or operations, are depicted. For example, computing system 1100 may be used to implement computing system 202 and to perform process 500. Computing system 1100 may include, for example, a processor, memory, storage, and input/output devices (e.g., monitor, keyboard, stylus, drawing device, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

In computing system 1100, the main system 1102 may include a motherboard 1104 with a bus that connects an input/output (I/O) section 1106, one or more central processing units (CPU) 1108, and a memory section 1110, which may have a flash memory card 1112 related to it. Memory section 1110 may contain computer-executable instructions and/or data for carrying out process 500. The I/O section 1106 may be connected to display 1124, a keyboard 1114, a disk storage unit 1116, and a media drive unit 1118. The media drive unit 1118 can read/write a non-transitory computer-readable storage medium 1120, which can contain programs 1122 and/or data.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for reviewing and editing a computer-generated animation, the method comprising:
   causing, by one or more processors, a display of an interface comprising a plurality of partitions representing a plurality of segments of the computer-generated animation;
   receiving a user selection of a first partition of the plurality of partitions;
   accessing geometry data associated with a first selected segment of the computer-generated animation corresponding to the selected first partition;
   causing a display of a geometric representation of the first selected segment;
   receiving a user selection of a second partition of the plurality of partitions;
   displaying a previously rendered representation of a second selected segment corresponding to the selected second partition, wherein the geometric representation of the first selected segment is displayed overlaid on the display of the previously rendered representation of the second selected segment;
   receiving a user selection of a third partition of the plurality of partitions;
   accessing geometry data associated with a third segment of the computer generated animation corresponding to the third partition;
   in accordance with a determination that the user selection of the third partition is of a first type, displaying frames of the third segment within the selected third partition of the plurality of partitions;
   in accordance with a determination that the user selection of the third partition is of a second type different from the first type, displaying frames of the third segment within an active segment portion of the interface; and
   in accordance with a determination that the user selection of the third partition is of a third type different from the second type and the first type, displaying a geometric representation of the third segment within an active segment portion of the interface.

2. The computer-implemented method of claim 1, wherein the plurality of segments comprises a plurality of contiguous shots of the computer-generated animation.

3. The method of claim 1, wherein each of the plurality of segments comprises a plurality of previously rendered frames of animation.

4. The method of claim 1, wherein the geometry data comprises one or more of an animation graph, a character rig, an animation curve, and a geometric representation of a scene used to render frames of animation of the first selected segment.

5. The method of claim 1, wherein accessing geometry data associated with the first selected segment comprises loading the geometry data in a memory accessible by the one or more processors.

6. The method of claim 1, wherein the method further comprises:
   receiving a user modification to the geometric representation of the first selected segment; and
   causing a display of a modified geometric representation of the first selected segment based on the received user modification.

7. The method of claim 6, wherein the method further comprises:
   receiving a request to store the user modification of the geometric representation of the first selected segment; and
   storing the user modification of the geometry representation of the first selected segment.

8. The method of claim 1, wherein the display of the geometric representation of the first selected segment is displayed concurrently with the plurality of partitions.

9. The method of claim 1, wherein the display of the previously rendered representation of the second selected segment is displayed sequentially in time with the geometric representation of the first selected segment.

10. The method of claim 1, wherein at least one of the plurality of partitions includes a visual indicator which indicates that an updated version of a respective segment of video corresponding to the at least one of the plurality of partitions is available.

11. A non-transitory computer-readable storage medium for reviewing and editing a computer-generated animation, the non-transitory computer-readable storage medium comprising computer-executable instructions for:
   causing, by one or more processors, a display of an interface comprising a plurality of partitions representing a plurality of segments of the computer-generated animation;
   receiving a user selection of a first partition of the plurality of partitions;
   accessing geometry data associated with a first selected segment of the computer-generated animation corresponding to the selected first partition;
   causing a display of a geometric representation of the first selected segment;
   receiving a user selection of a second partition of the plurality of partitions;
   displaying a previously rendered representation of a second selected segment corresponding to the selected second partition, wherein the geometric representation of the first selected segment is displayed overlaid on the display of the previously rendered representation of the second selected segment;
   receiving a user selection of a third partition of the plurality of partitions;
   accessing geometry data associated with a third segment of the computer generated animation corresponding to the third partition;
   in accordance with a determination that the user selection of the third partition is of a first type, displaying frames of the third segment within the selected third partition of the plurality of partitions,
   in accordance with a determination that the user selection of the third partition is of a second type different from the first type, displaying frames of the third segment within an active segment portion of the interface; and
   in accordance with a determination that the user selection of the third partition is of a third type different from the second type and the first type displaying a geometric, representation of the third segment within an active segment portion of the interface.

12. The non-transitory computer-readable storage medium of claim 11, wherein the plurality of segments comprises a plurality of contiguous shots of the computer-generated animation.

13. The non-transitory computer-readable storage medium of claim 11, wherein each of the plurality of segments comprises a plurality of previously rendered frames of animation.

14. The non-transitory computer-readable storage medium of claim 11, wherein the geometry data comprises one or more of an animation graph, a character rig, an animation curve, and a geometric representation of a scene used to render frames of animation of the first selected segment.

15. The non-transitory computer-readable storage medium of claim 11, wherein accessing geometry data associated with the first selected segment comprises loading the geometry data in a memory accessible by the one or more processors.

16. The non-transitory computer-readable storage medium of claim 11, further comprising instructions for:
receiving a user modification to the geometric representation of the first selected segment; and
causing a display of a modified geometric representation of the first selected segment based on the received user modification.

17. The non-transitory computer-readable storage medium of claim 16, further comprising instructions for:
receiving a request to store the user modification of the geometric representation of the first selected segment; and
storing the user modification of the geometry representation of the first selected segment.

18. The non-transitory computer-readable storage medium of claim 11, wherein the display of the geometric representation of the first selected segment is displayed concurrently with the plurality of partitions.

19. The non-transitory computer-readable storage medium of claim 11, wherein the display of the previously rendered representation of the second selected segment is displayed sequentially in time with the geometric representation of the first selected segment.

20. The non-transitory computer-readable storage medium of claim 11, wherein at least one of the plurality of partitions includes a visual indicator which indicates that an updated version of a respective segment of video corresponding to the at least one of the plurality of partitions is available.

21. A system for reviewing and editing a computer-generated animation, the system comprising:
a display;
one or more processors;
memory; and
one or more programs, wherein the one or more programs are stored in the memory and configured to be executed by the one or more processors, the one or more programs comprising instructions for:
causing, by one or more processors, a display of an interface comprising a plurality, of partitions representing a plurality of segments of the computer-generated animation;
receiving a user selection of a first partition of the plurality of partitions;
accessing geometry data associated with a first selected segment of the computer-generated animation corresponding to the selected first partition;
causing a display of a geometric representation of the first selected segment;
receiving a user selection of a second partition of the plurality of partitions;
displaying a previously rendered representation of a second selected segment corresponding to the selected second partition, wherein the geometric representation of the first selected segment is displayed overlaid on the display of the previously rendered representation of the second selected segment;
receiving a user selection of a third partition of the plurality of partitions;
accessing geometry data associated with a third segment of the computer generated animation corresponding to the third partition;
in accordance with a determination that the user selection of the third partition is of a first type, displaying frames of the third segment within the selected third partition of the plurality of partitions;
in accordance with a determination that the user selection of the third partition is of a second type different from the first type, displaying frames of the third segment within an active segment portion of the interface; and
in accordance with a determination that the user selection of the third partition is of a third type different from the second type and the first type, displaying a geometric representation of the third segment within an active segment portion of the interface.

22. The system of claim 21, wherein the plurality of segments comprises a plurality of contiguous shots of the computer-generated animation.

23. The system of claim 21, wherein each of the plurality of segments comprises a plurality of previously rendered frames of animation.

24. The system of claim 21, wherein the geometry data comprises one or more of an animation graph, a character rig, an animation curve, and a geometric representation of a scene used to render frames of animation of the first selected segment.

25. The system of claim 21, wherein accessing geometry data associated with the first selected segment comprises loading the geometry data in a memory accessible by the one or more processors.

26. The system of claim 21, further comprising instructions for:
receiving a user modification to the geometric representation of the first selected segment; and
causing a display of a modified geometric representation of the first selected segment based on the received user modification.

27. The system of claim 26, further comprising instructions for:
receiving a request to store the user modification of the geometric representation of the first selected segment; and
storing the user modification of the geometry representation of the first selected segment.

28. The system of claim 21, wherein the display of the geometric representation of the first selected segment is displayed concurrently with the plurality of partitions.

29. The system of claim 21, wherein the display of the previously rendered representation of the second selected segment is displayed sequentially in time with the geometric representation of the first selected segment.

30. The system of claim 21, wherein at least one of the plurality of partitions includes a visual indicator which indicates that an updated version of a respective segment of video corresponding to the at least one of the plurality of partitions is available.

* * * * *